United States Patent [19]

Springer

[11] 4,284,042
[45] Aug. 18, 1981

[54] MULTICYLINDER INTERNAL COMBUSTION ENGINE WITH VALVE DISCONNECTION

[75] Inventor: Willi Springer, Göppingen, Fed. Rep. of Germany

[73] Assignee: Daimler-Benz Aktiengesellschaft, Stuttgart, Fed. Rep. of Germany

[21] Appl. No.: 26,190

[22] Filed: Apr. 2, 1979

[30] Foreign Application Priority Data

Apr. 1, 1978 [DE] Fed. Rep. of Germany ....... 2814087
Apr. 3, 1978 [DE] Fed. Rep. of Germany ....... 2814307

[51] Int. Cl.³ ............................................. F02D 13/06
[52] U.S. Cl. ............................... 123/198 F; 123/90.16; 123/90.27; 123/90.32
[58] Field of Search ............... 123/90.15, 90.16, 90.27, 123/90.32, 198 F

[56] References Cited

U.S. PATENT DOCUMENTS

| 4,104,991 | 8/1978 | Abdoo | 123/198 F |
| 4,151,817 | 5/1979 | Mueller | 123/90.16 |
| 4,151,824 | 5/1979 | Gilbert | 123/198 F |
| 4,173,209 | 11/1979 | Jordan | 123/198 F |
| 4,200,081 | 4/1980 | Meyer et al. | 123/198 F |

FOREIGN PATENT DOCUMENTS 2621794 11/1976 Fed. Rep. of Germany ....... 123/198 F
2725529 4/1978 Fed. Rep. of Germany ....... 123/198 F

*Primary Examiner*—Ira S. Lazarus
*Attorney, Agent, or Firm*—Craig and Antonelli

[57] ABSTRACT

A multicylinder internal combustion engine with valve disconnection wherein an intermediate mechanical device is interposed between an end of the valve stem end and a valve actuating mechanism with the intermediate mechanical device arbitrarily serving, in one case, as a rigid intermediate member between the end of the valve stem and the valve actuating mechanism and, in another case, in a closed setting of the valve, abolishes or eliminates the interconnection between the end of the valve stem and the valve actuating means.

16 Claims, 9 Drawing Figures

MULTICYLINDER INTERNAL COMBUSTION ENGINE WITH VALVE DISCONNECTION

The present invention relates to a multicylinder internal combustion engine and, more particularly, to a valve disconnection or shut-off arrangement for six or eight cylinder internal combustion engines.

It has been proposed, especially in partial load operation of a multicylinder internal combustion engine, to temporarily deactivate or disconnect the valves of at least some of the cylinders so as to reduce the fuel consumption of the internal combustion engine.

The improvement in fuel consumption by deactivation or disconnection of one or several cylinders of the internal combustion engine results from the reduced charge changing work of the cutoff cylinder or cylinders and the more favorable consumption of the remaining cylinders that are working under a greater load. More particularly, the operative cylinders operate at a higher average pressure and a higher average pressure results in a lower specific fuel consumption which can be readily determined from usual fuel consumption characteristics of reciprocating-piston internal combustion engines.

The aim underlying the present invention essentially resides in providing a valve disconnection or shut-off arrangement for a multicylinder internal combustion engine that enables an acceptable valve disconnection or deactivation with small moved masses and low friction.

According to advantageous features of the present invention, a mechanical device is introduced between a valve stem end and the valve actuating means which device, on the one hand, will arbitrarily act as a rigid intermediate member between the valve stem end and the valve actuating means and, on the other hand, in a closed position of the valve, eliminate or abolish the connection between the valve stem end and the valve actuating means.

In accordance with the present invention, the mechanical device includes an adjusting sleeve that is operatively connected to the valve stem end and is rotatable by a switching means as well as a pressure piece cooperating with the adjusting sleeve like a coupling and applied to the valve actuating means by way of a biasing means such as a spring so as to be constantly under pressure and fixed in rotation.

According to further features of the present invention, the pressure piece may be provided with stilts or legs that occasionally act as tappets, with the stilts or legs being applied for valve actuation on the adjusting sleeve and pressing, by way of the adjusting sleeve, on the valve but being retracted upon a disconnection or shut-off of the valve into a cavity or opening of the adjusting sleeve.

Moreover, in accordance with the present invention, the adjusting sleeve includes a pot-shaped bearing pot which is bent over or extends over the valve stem end that acts as a pivot and is provided with teeth having upper surfaces to which the lower ends of the legs or stilts are constantly applied in an actuation of the valve. The bearing part may be provided with at least two diametrically opposed lug cams for limiting the motion of the adjusting sleeves in both directions of rotation.

Moreover, in accordance with the present invention, the bearing part of the adjusting sleeve is surrounded by a hat-shaped spring plate having a flange against which one end of the spring is braced with the other end of the spring being braced on a shoulder of the pressure piece. The spring plate is provided with holes or apertures into which the longitudinally movable legs or stilts are introduced.

The adjusting sleeve of the present invention includes a lever arm that extends radially outwardly with a linkage forming a switching means being articulated to articulation pins provided on the lever arm.

In accordance with a further embodiment of the present invention, an adjusting lever may be applied to the valve stem end with the adjusting lever being of a substantially flat or plate shaped configuration and being rotatable by a switching means as well as being guided in a guide sleeve connected with a pressure piece. A spring may be disposed below the pressure piece so as to constantly press or urge the adjusting lever on the end of the valve stem.

In accordance with additional features of the present invention, the guide sleeve may have a stepped configuration so that a lower sleeve part is guided so as to be longitudinally slidable upon a hat-shaped guide element held on a cylinder head side with a shoulder of the guide sleeve serving as a bearing part for a spring which is concentrically disposed with respect to the valve spring and with the other end of the spring being braced on a shoulder provided on the hat-shaped guide element.

The adjusting lever according to the present invention may include at least three arms that extend radially outwardly with one of the arms extending from the guide sleeve and being provided with a bearing bore that serves as an articulation point for part of the switching linkage. The arms of the adjusting lever may be provided with slide elements that are adapted to be applied to a guide sleeve.

The switching means in accordance with the present invention may include an electromagnet which is connected by way of, for example, a parallelogram-like connecting linkage with the adjusting levers or the adjusting sleeves operatively connected with the inlet and exhaust valves of the engine.

A return spring is operatively connected with the adjusting lever or adjusting sleeve so as to maintain the same in a position that keeps the valve in an inoperative or disconnected position when the electromagnet is not energized.

In an internal combustion engine with a rocker arm or lever control for the valves, the pressure piece is provided with upwardly directed guide arms that are slidably applied to the rocker arms or lever.

Moreover, to provide a limitation of the path of motion for the adjusting lever, in accordance with yet a still further feature of the present invention, adjustable end stops are disposed on a fastening plate for mounting the electromagnet in the engine.

Accordingly, it is an object of the present invention to provide a valve disconnection or shut-off or arrangement of a multicylinder internal combustion engine which avoids, by simple means, shortcomings and disadvantages encountered in the prior art.

Another object of the present invention resides in providing a valve shut-off or disconnection arrangement of an internal combustion engine whereby it is possible to obtain an acceptable valve shut-off or disconnection with small moved masses and low friction.

Another object of the present invention resides in providing a valve shut-off or disconnection arrangement of an internal combustion engine by which it is possible to obtain a more favorable fuel consumption of the engine.

Yet another object of the present invention resides in providing a valve shut-off or disconnection arrangement for an internal combustion engine which is simple in construction and therefore relatively inexpensive to manufacture.

A still further object of the present invention resides in providing a valve shut-off or disconnection arrangement of an internal combustion engine which functions reliably under all operating conditions.

Another object of the present invention resides in providing a valve shut-off or disconnection arrangement of an internal combustion engine by which it is possible to selectively obtain a rigid interconnection between a valve stem end and a valve actuating means and to eliminate such interconnection.

These and other objects, features, and advantages of the present invention will become more apparent from the following description when taken in connection with the accompanying drawings, which show, for the purposes of illustration only, several embodiments in accordance with the present invention, and wherein.

Figure 1:
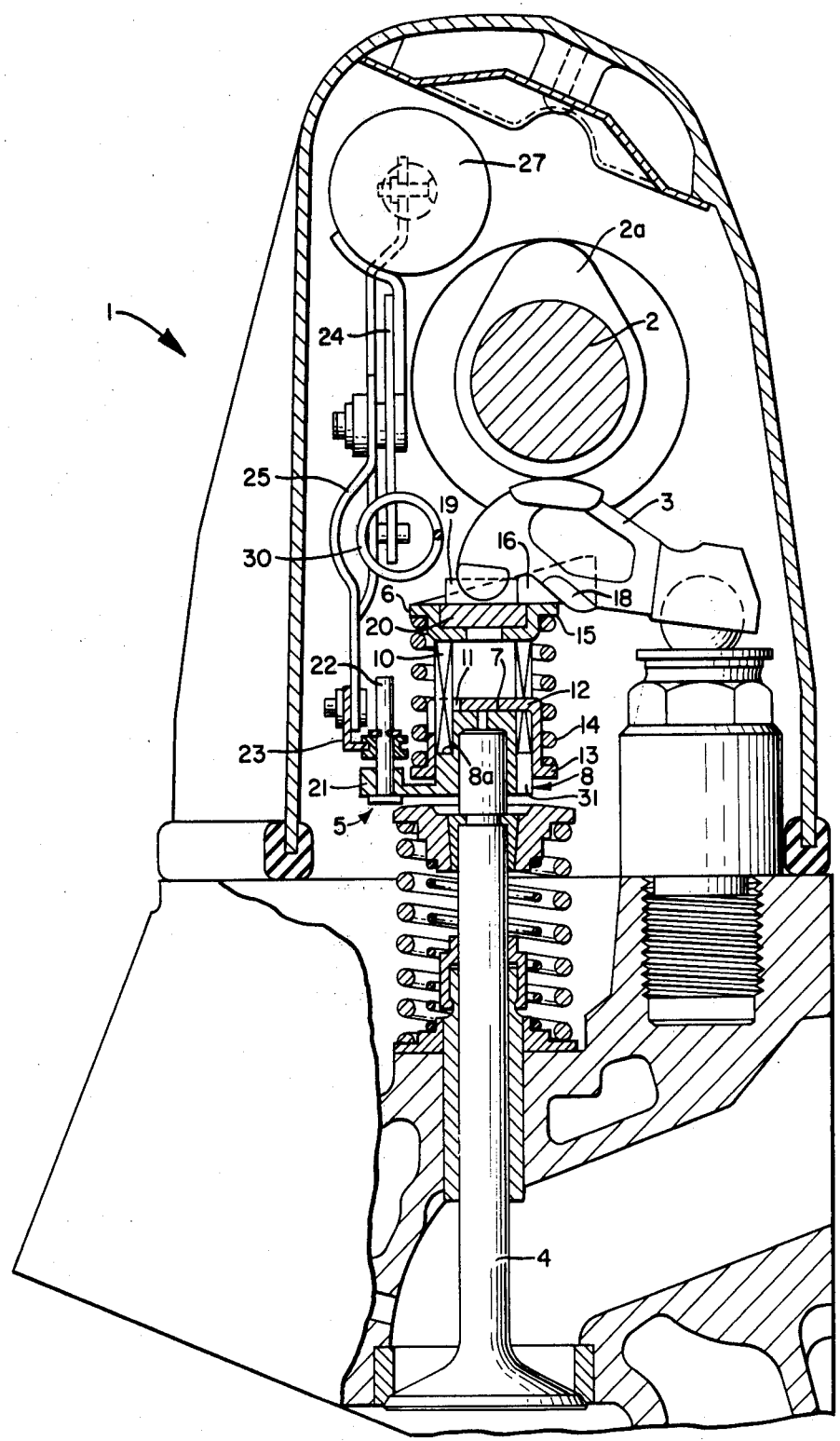
FIG. 1 is a partial cross-sectional view of a valve shut-off or disconnection arrangement with all of the elements of the arrangement being disposed above an upper spring plate of the valve and with a left half of the valve disconnecting device being illustrated in a connecting state with the right half of the valve disconnecting device illustrating a disconnected state of the valve.

Referring now to the drawings, wherein like reference numerals are used throughout the various views to designate like parts and, more particularly, to FIG. 1, according to this Figure, an arrangement for shutting off or disconnecting inlet and exhaust valves of a six-cylinder or other multicylinder internal combustion engine generally designated by the reference numeral 1 is introduced between a rocker arm or lever 3 and a stem end of a valve 4 adapted to be actuated by a cam 2a provided on a camshaft 2.

As shown in FIG. 1, the valve shut-off or disconnection device includes a rotatable adjusting sleeve generally designated by the reference numeral 5 and a plate-like circular pressure piece 6 cooperating therewith and fixed in rotation.

Figure 5:
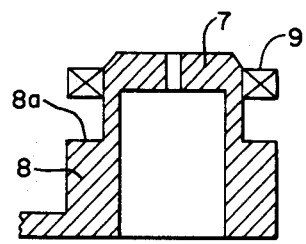
FIG. 5 is a cross-sectional view of a pot-shaped bearing member of the adjustment means of FIGS. 3 and 4 constructed as a tubular sleeve member.

The adjusting sleeve 5 is provided with a pot-shaped bearing member 7 shown most clearly in FIG. 5, which is bent over an end of the valve stem with the stem forming a center of rotation for the adjusting sleeve 5.

Figure 4:
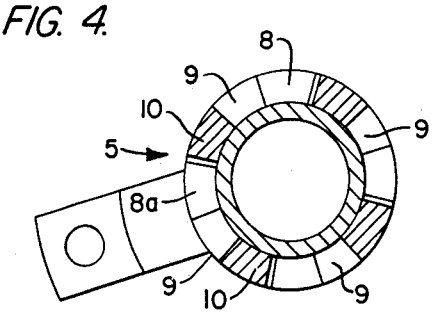
FIG. 4 is a top partial cross-sectional view similar to FIG. 3 illustrating the position of the elements in a valve connected position.
Figure 3:
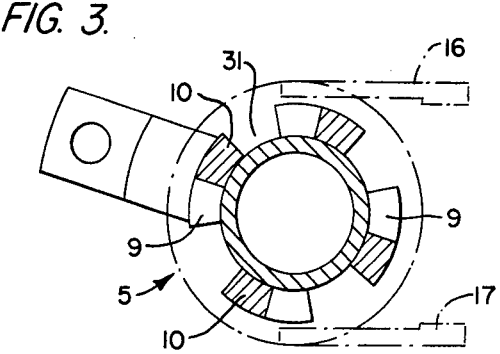
FIG. 3 is a top partial cross-sectional view illustrating the positioning of an adjusting means and pressure means with associated legs or projections with the valves in a shut-off or disconnected position.

As shown most clearly in FIGS. 3 and 4, the bearing member 7 is provided with teeth 8 which are evenly distributed about the periphery thereof with the teeth 8 only when the valves are connected, serving as a stop for legs or stilts 10 which extend downwardly from the pressure piece 6. When the valve 4 is disconnected, the legs or stilts 10 penetrate into intermediate spaces or tooth gaps between the teeth 8 of the bearing member 7 of the adjusting sleeve 5 that have been rotated into the new position such as illustrated in FIG. 4. Two diametrically opposed cams or lugs 9 are provided on the bearing member 7 and serve to limit the motion of the adjusting sleeve 5 in both rotational directions.

A hat-shaped spring element or plate 12 extends over the bearing member or part 7 with the spring plate 13 being provided with openings or perforations 11 for accommodating the legs or stilts 10. The teeth 8 of the bearing member 7 of the adjusting sleeve 5 are loosely in engagement with a cylindrical inner wall of the spring plate 12. The spring plate 12 is provided with a flange 13 which serves as an abutment surface for one end of a compression spring 14, the other end of which bears against an abutment of the shoulder 15 of the pressure piece 6. The pressure piece 6 is urged or pressed by the compression spring 14 against the rocker arm or lever 3 so as to be maintained in constant contact with the cam 2a of the camshaft 2.

As schematically indicated in FIG. 3, two guide arms 16, 17 are provided at the edge of the circular pressure piece 6, which guide arms 16, 17 extend beyond the edge of the pressure piece 6 such that there free ends are slidingly applied to slide surfaces 18 (FIG. 1) of the rocker arm or lever 3. By virtue of such an arrangement, it is possible to secure the rotation of the pressure piece 6 and, consequently, insure an acceptable operation of the valve shut-off or disconnection means. The rocker arm or lever 3 is guided in a slide guide 19 of a setting plate 20 inserted in the pressure piece 6.

Figure 2:
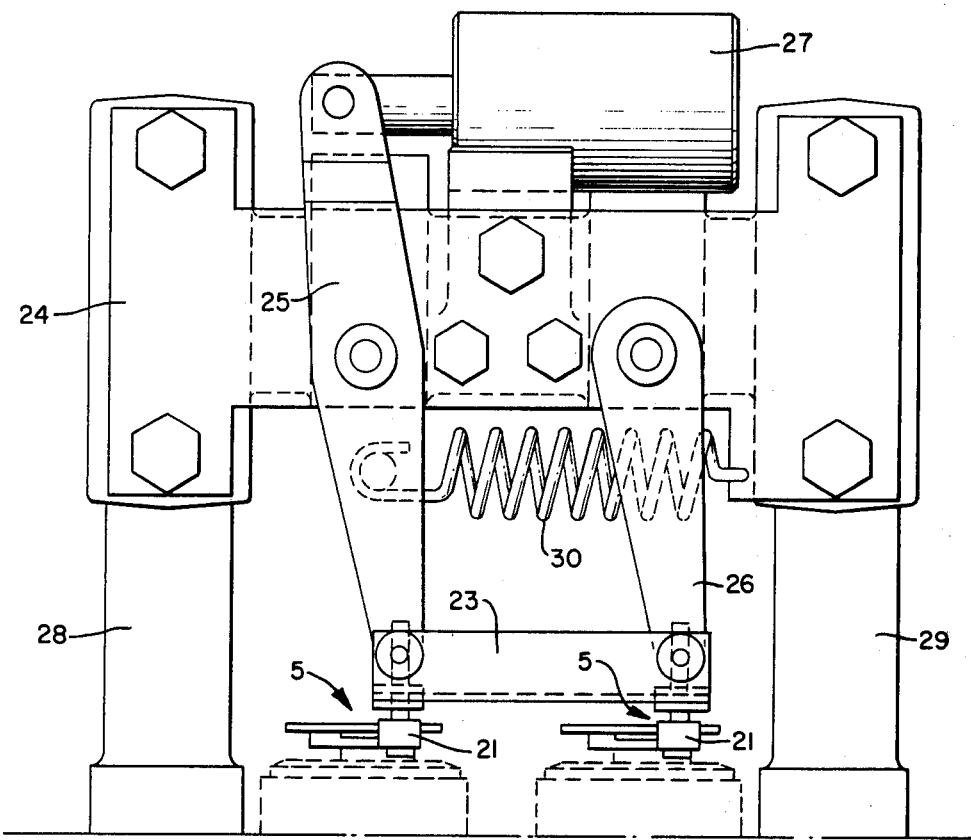
FIG. 2 is a partially schematic front view of a switching means for the valve disconnection or shut-off arrangement of FIG. 1.

As shown in FIGS. 1 and 2, the rotatable adjusting sleeve 5 is provided with a lever arm 21 which extends radially outwardly and accommodates on its free end a fixedly set-in articulation pin 22.

To provide for rather brief switchover time and to simplify the setting mechanism, the inlet and exhaust valves of the respective cylinders are switched together to a disconnected or shut-off position.

As shown in FIG. 2, the pins 22 of the adjusting sleeve 5 of the inlet and exhaust valve are carried by a common connecting piece 23 guided by two levers 25, 26 rotatably mounted in a fastening plate 24 fixed on bearing blocks 28, 29 of the camshaft 2. The lever 25 has a greater length than the lever 26 and is connected with a switching or actuating magnet 27 which is bolted to the fastening plates 24.

A return spring 30 is provided for effecting a switching of the position of the valve to a disconnect or inoperative position upon a de-energization of the magnet 27.

When the magnet 27 is energized, the inlet and exhaust valves are incorporated in the cam drive by a turning of the adjusting sleeve 5 and thereby they become operative. When the magnet is switched off or de-energized, a return spring 30 functions to switch the position of the elements so that the inlet and exhaust valves are shut-off or disconnected.

FIG. 1 provides an illustration of the respective position of the valve shut-off or disconnection means of the present invention with the first position being illustrated on the left side of the end of the valve stem. In this position, the legs or stilts 10 of the pressure piece 6, acting as tappets, are applied to an upper face 8a of a tooth 8 of the bearing member 7 of the adjusting sleeve 5. In the second position illustrated on the right side of the valve stem end, the legs or stilts 10 of the pressure piece 6 are shown just prior to a penetration or an entering into the space or gap 31 formed between adjacent teeth 8 of the bearing part 7 of the adjusting sleeve 5.

Figure 6:
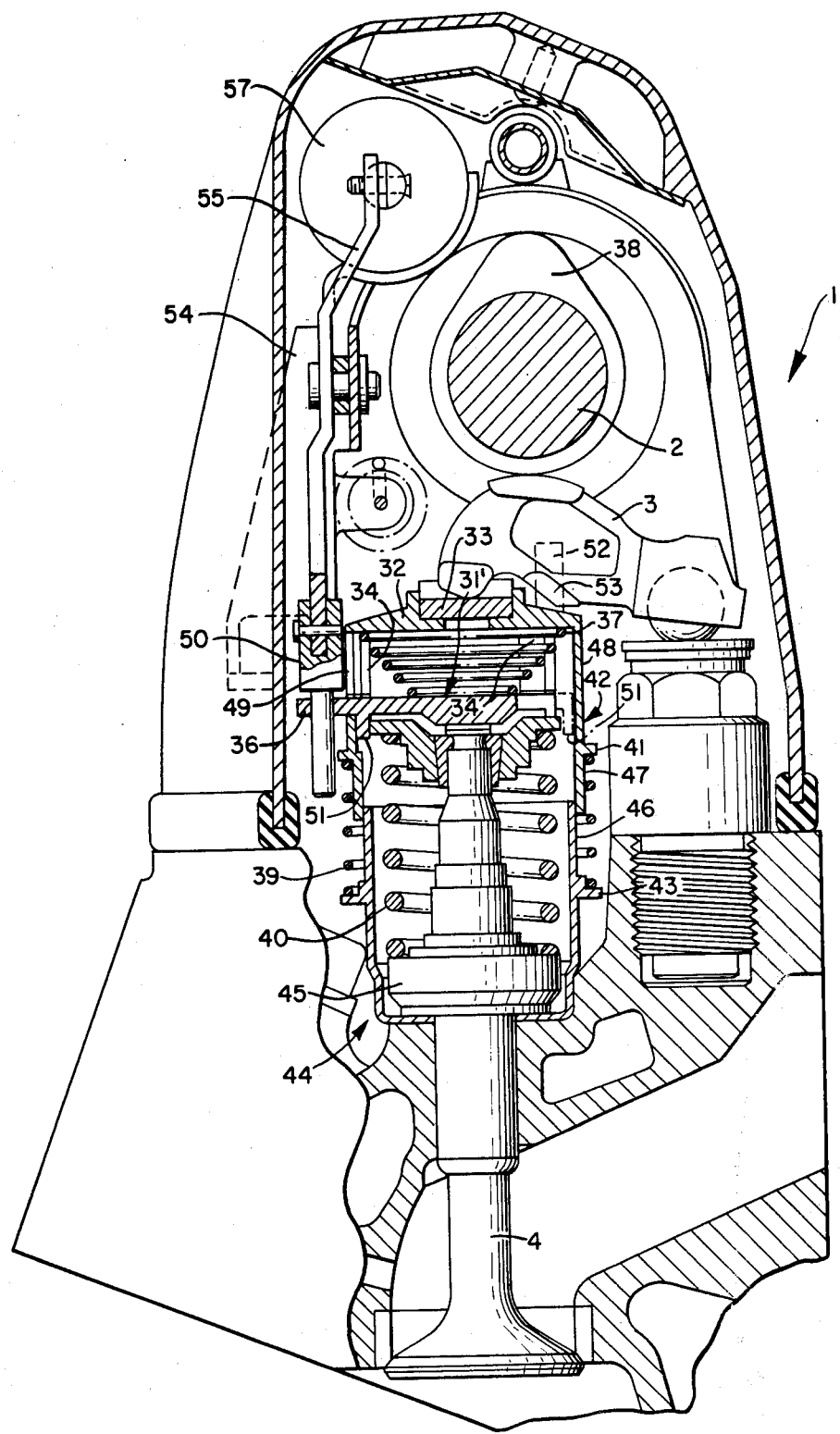
FIG. 6 is a partial cross-sectional view of another embodiment of a valve shut-off or disconnection arrangement in accordance with the present invention with the elements thereof being disposed both above an upper valve plate and in a region of a valve spring.

FIG. 6 provides an example of a valve disconnection or shut-off device constructed especially for a six or eight-cylinder internal combustion engine 1 with an overhead camshaft 2 and with valve actuation by a rocker arm or lever 3 with the valve shut-off or disconnection arrangement being introduced between the rocker arm or lever 3 and an end of the stem of the valve 4.

The valve disconnecting or cut-off arrangement of FIG. 6 differs from the arrangement of FIG. 1 in its overall construction by a shorter height in spite of the provision of a valve turning device. The disconnecting or shut-off device of FIG. 6 includes a rotatably mounted three-armed flat setting or adjusting lever 30 generally designated by the reference numeral 31' and a circular pressure piece 32 that is fixed in rotation and cooperates therewith. The flat setting or adjusting lever 31' is pressed against the rocker arm or lever 3 by a slide plate 33 centered in the pressure piece 32.

Figure 8:
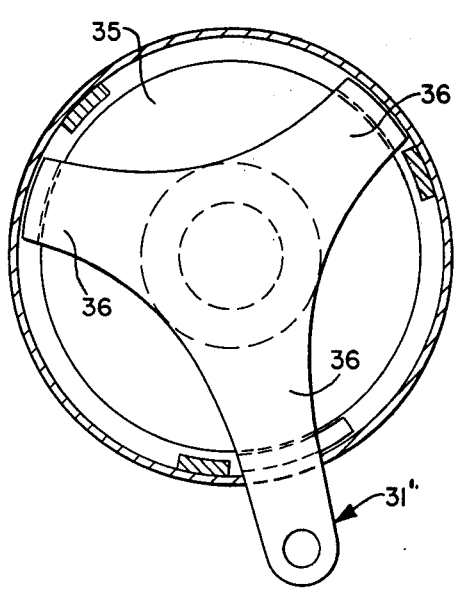
FIGS. 8 and 9 are partial cross-sectional top views of an adjusting lever means of the arrangement of FIG. 6 illustrating a "valve on" and a "valve off" position of the adjusting lever means.

In an edge zone of the circular pressure piece 32, three legs or stilts 34 are provided which, in a cut-off or disconnect position of the valve, penetrate into spaces 35 between the three guide arms 36 of the adjusting lever 31' (FIG. 8). In the switching position, the adjusting lever 31' is pressed by a truncated cone spring 37, guided in the pressure piece 32, onto the valve stem end of the valve 4.

A compression spring 39 for maintaining a constant contact of the rocker arm or lever 3 with the cam 38 is disposed concentrically with respect to a valve spring 40. The compression spring 39 has one end braced on a shoulder 41 of a two-step guide sleeve generally designated by the reference numeral 42 that is fixedly connected with the pressure piece 32 and with the other end braced on a shoulder 43 of a hat-shaped guide element generally designated by the reference numeral 44 disposed on the cylinder head side of the internal combustion engine 1. The guide element 44 serves at the same time to receive a valve turning device 45. The lower sleeve part 47 of the guide sleeve 42 slides on the cylindrical part 46 of the guide element 44. The upper sleeve part 48 of the guide sleeve 42 surrounds the legs or stilts 34 of the pressure piece 32 and is provided with a slot or opening 49 into which an outwardly extending elongated arm 36 of the adjusting lever 31' is guided. A free end of this arm 36 is carried by a connecting piece 50. All three arms 36 of the adjusting lever 31' are provided with slide feet 51 which are adapted to be slidingly applied to an inner surface of the sleeve part 48.

Figure 9:
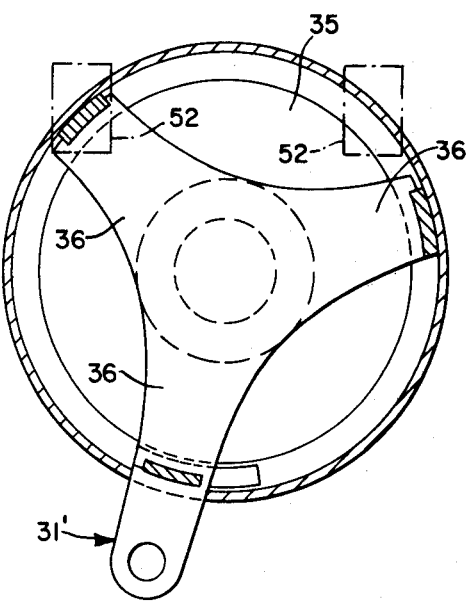

Two guide arms 36 of the adjusting lever 31' that engage the rocker arm or lever 3 are so disposed in a half of the pressure piece 32 (FIGS. 6, 9) so that their free ends are guided on the lateral slide surfaces 53 of the rocker arm or lever 3. Upwardly directed guide arms 52, schematically illustrated in FIG. 9, are provided at the pressure piece 32 with the guide arms being slidingly applied to the rocker arm or lever 3. By virtue of such an arrangement, it is possible to secure the rotation of the pressure piece 32 and, consequently, ensure an acceptable functioning of the valve disconnection.

To provide for a rather brief switching time and to simplify the setting mechanism, the inlet and exhaust valves of the respective cylinders are disconnected or shut-off together.

Figure 7:
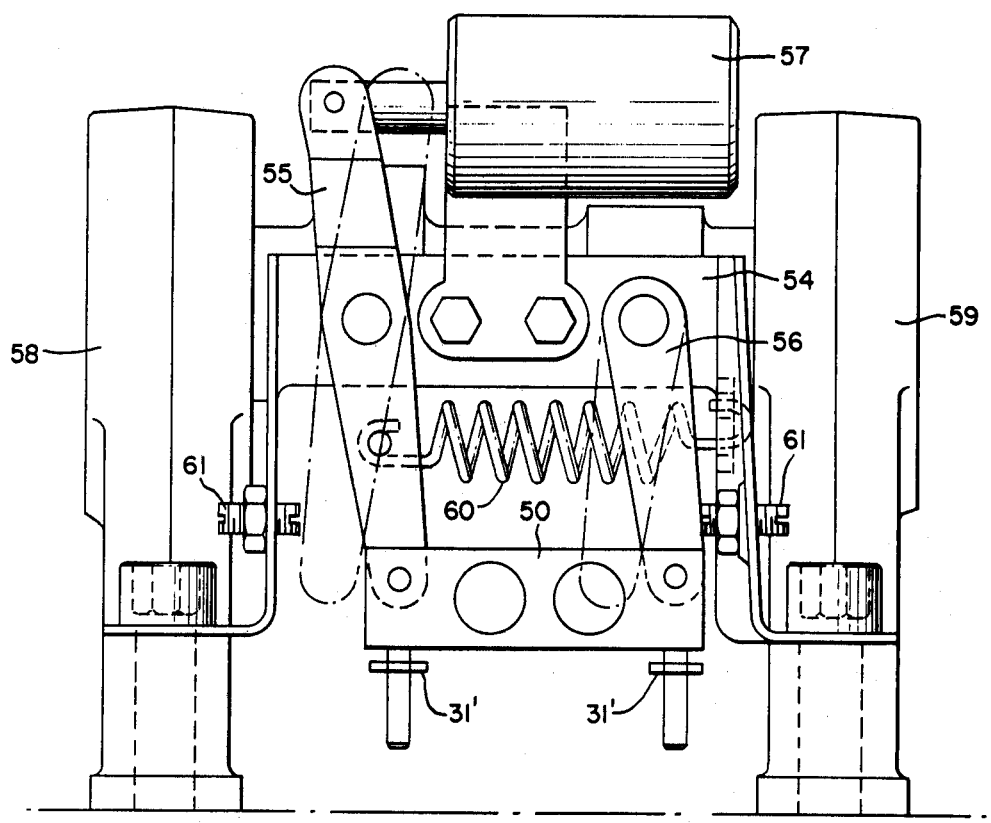
FIG. 7 is a partially schematic front view of a switching means for the valve disconnection or shut-off arrangement of FIG. 6.

As shown in FIG. 7, the elongated arms 36 of the adjusting lever 31' of the inlet and exhaust valves are carried by a common connecting piece 50 which is guided by two levers 55, 56 rotatably mounted in a fastening plate 54 fixed on bearing blocks 58, 59 of the camshaft 2. The lever 55 has a greater length than the lever 56 and is connected with a switching magnet 57 bolted to the fastening plate 54.

A return spring 60 is provided for effecting a switching of the position of the valves to a shut-off or disconnect position upon a deenergization of the switching magnet 57.

As with the arrangement of FIG. 1, when the magnet 57 is energized, the inlet and exhaust valves are incorporated in the cam drive by rotation of the adjusting lever 31' and thereby put into operation. When the magnet 57 is switched off or de-energized, the return spring 60 brings about a switching of the position of the valves to a disconnect or shut-off position.

As shown in FIG. 7, adjustable end stops 61 may be provided on the fastening plate 54 for limiting a displacement path of the levers 55, 56.

In the embodiment of FIG. 1 as with that of FIG. 6, the turning of the adjusting sleeve 5 or adjusting lever 31' occurs at a time at which both the inlet and exhaust valves are closed since the adjusting sleeve 5 or adjusting lever 31' can only be turned when the valves are in a closed position.

In eight cylinder internal combustion engines, two or four cylinders may be shut off or disconnected; whereas, with six cylinder engines, the shut-off or disconnection is limited to three cylinders. Simultaneously with a valve disconnection, the supply of fuel to the shut-off or disconnected cylinders may be interrupted by suitable means (not shown).

While I have shown and described only two embodiments in accordance with the present invention, it is understood that the same is not limited thereto but is susceptible of numerous changes and modifications as known to one having ordinary skill in the art, and I therefore do not wish to be limited to the details shown and described herein but intend to cover all such changes and modifications as are encompassed by the scope of the appended claims.

I claim:

1. A multicylinder internal combustion engine which includes a valve means for the respective cylinders of the engine and means for selectively shutting off a valve means of at least one of the cylinders, the valve means including a valve stem and a valve actuating means, characterized in that an intermediate mechanical device is interposed between an end of the valve stem and the valve actuating means for selectively forming a rigid interconnection between the valve stem and valve actuating means and, in a closed setting of the valve means, for eliminating the interconnection between the end of the valve stem and the valve actuating means, a pressure member is arranged between the intermediate mechanical device and the valve actuating means, and in that a spring means is disposed below the pressure member for constantly urging the intermediate mechanical device into abutment with the end of the valve stem.

2. A multicylinder internal combustion engine according to claim 1, characterized in that the intermediate mechanical means includes an adjusting sleeve means rotatably mounted at an end of the valve stem, switching means for selectively rotating the adjusting sleeve means.

3. A multicylinder internal combustion engine according to claim 2, characterized in that the pressure member includes a plurality of leg means which are adapted to selectively act as tappets, said leg means being adapted to be applied to the adjusting sleeve means for an actuation of the valve means and to be retracted into a gap provided in the adjusting sleeve means upon a disconnection of the valve means.

4. A multicylinder internal combustion engine according to claim 3, characterized in that the adjusting sleeve means includes a pot-shaped bearing member which is adapted to be superimposed over an end of the valve stem with the valve stem forming a center of rotation for the adjusting sleeve means, and in that the bearing member is provided with teeth having upper surfaces upon which the leg means are constantly applied during an actuation of the valve means.

5. A multicylinder internal combustion engine according to claim 4, characterized in that the bearing member is provided with two diametrically opposed cam means for limiting a motion of the adjusting sleeve means in both directions of rotation.

6. A multicylinder internal combustion engine according to claim 5, characterized in that a hat-shaped spring plate means is provided for surrounding the bearing member, the spring plate means includes a flange portion and the pressure member includes an abutment shoulder, the spring means are disposed such that one end thereof is in engagement with the flange portion and the other end thereof is engagement with the abutment shoulder, and in that aperture means are provided in the spring plate means for longitudinally displaceably accommodating the leg means.

7. A multicylinder internal combustion engine according to claim 6, characterized in that the adjusting sleeve means includes a lever arm extending radially outwardly, the switching means includes a switching linkage, and in that pin means are provided on the lever arm for articulatingly connecting the linkage means with the lever arm.

8. A multicylinder internal combustion engine according to claim 1, characterized in that the intermediate mechanical means includes a substantially flat adjusting lever means rotatably mounted at the end of the valve stem, switching means are provided for selectively rotating the adjusting lever means, and in that a guide sleeve means is connected with the pressure member for guiding the adjusting lever means.

9. A multicylinder internal combustion engine which includes a valve means for the respective cylinders of the engine and means for selectively shutting off the valve means of at least one of the cylinders, the valve means including a valve stem and a valve actuating means, characterized in that an intermediate mechanical device is interposed between an end of the valve stem and the valve actuating means for selectively forming a rigid interconnection between the valve stem and valve actuating means and, in a closed setting of the valve means, for eliminating the interconnection between the valve stem and the valve actuating means, the intermediate mechanical means includes a substantially flat adjusting lever means rotatably mounted at the end of the valve stem, switching means are provided for selectively rotating the adjusting lever means, a pressure member is provided and is operatively associated with the valve actuating means, a guide sleeve means is connected with the pressure member for guiding the adjusting lever means, a spring means is disposed below the pressure member for constantily urging the adjusting lever means toward the end of the valve stem, the guide sleeve means is fashioned as a stepped member and includes a lower sleeve part adapted to be guided so as to be longitudinally slidable on a hat-shaped guide element arranged on a cylinder head size of the engine, the guide sleeve means further includes a shoulder means for forming a bearing member for a first end of the spring means, the spring means is concentrically disposed with respect to a valve spring of the valve means, and in that a second end of the spring means is engageable with a shoulder means provided on the hat-shaped guide element.

10. A multicylinder internal combustion engine according to claim 9, characterized in that the adjusting lever means includes at least three arms extending radially outwardly, one of the three arms extending from the guide sleeve means and being provided with a bearing bore means for accommodating an articulation means for a portion of the switching means.

11. A multicylinder internal combustion engine according to claim 10, characterized in that the lever arms of the adjusting lever means are each provided with a slide means adapted to be applied to the guide sleeve means.

12. A multicylinder internal combustion engine according to one of claims 2, 3, 4, 6, 8, 9 or 10, characterized in that the valve means form inlet and exhaust valves of the engine, and in that the switching means further includes an electromagnetic means and a linkage means connected to the electromagnetic means and adapted to be coupled to the adjusting sleeve means or the adjusting lever means so as to position the inlet and exhaust valves.

13. A multicylinder internal combustion engine according to claim 12, characterized in that a return spring means is provided for maintaining the electromagnetic means in a position wherein the valve means are disconnected when the electromagnetic means is not energized.

14. A multicylinder internal combustion engine according to claim 13, characterized in that the valve actuating means includes rocker lever arms, and in that the pressure members include upwardly directed guide arms adapted to slidingly engage the rocker arm levers.

15. A multicylinder internal combustion engine according to one of claims 8, 9, 10, or 11, characterized in that adjustable stop means are provided for limiting a path of motion of the adjusting lever means.

16. A multicylinder internal combustion engine according to claim 15, characterized in that the switching means includes an electromagnetic means and a linkage means connected to the electromagnetic means and adapted to be coupled to the adjusting lever means.

* * * * *